US009195621B2

(12) United States Patent
Xu et al.

(10) Patent No.: US 9,195,621 B2
(45) Date of Patent: Nov. 24, 2015

(54) SYSTEM AND METHOD FOR ASSIGNING MEMORY ACCESS TRANSFERS BETWEEN COMMUNICATION CHANNELS

(71) Applicants: Kun Xu, Austin, TX (US); Tommi M. Jokinen, Austin, TX (US); David B. Kramer, Cedar Park, TX (US)

(72) Inventors: Kun Xu, Austin, TX (US); Tommi M. Jokinen, Austin, TX (US); David B. Kramer, Cedar Park, TX (US)

(73) Assignee: Freescale Semiconductor, Inc., Austin, TX (US)

(*) Notice: Subject to any disclaimer, the term of this patent is extended or adjusted under 35 U.S.C. 154(b) by 284 days.

(21) Appl. No.: 13/838,133

(22) Filed: Mar. 15, 2013

(65) Prior Publication Data

US 2014/0281335 A1 Sep. 18, 2014

(51) Int. Cl.
*G06F 13/16* (2006.01)
*G06F 13/28* (2006.01)

(52) U.S. Cl.
CPC ........ *G06F 13/1631* (2013.01); *G06F 13/1647* (2013.01); *G06F 13/28* (2013.01); *G06F 2213/16* (2013.01); *G06F 2213/2806* (2013.01)

(58) Field of Classification Search
None
See application file for complete search history.

(56) References Cited

U.S. PATENT DOCUMENTS

| 6,012,106 | A | | 1/2000 | Schumann et al. |
| 6,049,841 | A | * | 4/2000 | Fields et al. ..................... 710/28 |
| 6,145,065 | A | * | 11/2000 | Takahashi ........... G06F 13/1631 711/105 |
| 7,577,773 | B1 | | 8/2009 | Gandhi et al. |
| 8,677,044 | B1 | * | 3/2014 | Gandhi et al. ................ 710/308 |
| 8,880,756 | B1 | * | 11/2014 | Birsan et al. .................... 710/22 |
| 2004/0030849 | A1 | * | 2/2004 | Borkenhagen et al. ....... 711/156 |
| 2005/0091460 | A1 | * | 4/2005 | Rotithor et al. ............... 711/158 |
| 2006/0026342 | A1 | * | 2/2006 | Calvignac et al. ............. 711/105 |
| 2009/0150576 | A1 | * | 6/2009 | Madruga et al. ................ 710/28 |
| 2010/0325338 | A1 | * | 12/2010 | Ueno et al. ........................ 711/5 |

* cited by examiner

*Primary Examiner* — Nathan Sadler

(57) ABSTRACT

A communication channel controller includes a queue, a memory map, and a scheduler. The queue to store a first memory transfer request received at the communication channel controller. The memory map stores information to identify a memory address range to be associated with a memory. The scheduler to compare a source address of the first memory transfer in the queue to the memory address range in the memory map to determine whether the source address of the first memory transfer request targets the memory, and in response allocate the first memory transfer request to a first communication channel of a plurality of communication channels in response to the first communication channel having all of its outstanding memory transactions to a common source address bank and source address page as a source address bank and a source address page of the first memory transfer request.

20 Claims, 7 Drawing Sheets

US 9,195,621 B2

SYSTEM AND METHOD FOR ASSIGNING MEMORY ACCESS TRANSFERS BETWEEN COMMUNICATION CHANNELS

FIELD OF THE DISCLOSURE

This disclosure generally relates to data processing, and more particularly to a system and method for assigning memory access transfers between communication channels.

BACKGROUND

A direct memory access (DMA) controller implements data transfer requests to transfer data from one system address location to another system address location. For example, based on a transfer request the DMA controller can transfer data between a memory of an integrated circuit and an external memory. Some types of memory, such as double data rate (DDR) memory can queue multiple data read requests from one or more communication channels, and can re-order the data read requests so that data for a later received access request is accessed by the DDR memory prior to data for an earlier received access request.

For example, a DDR can re-order data read requests to facilitate the occurrence of page hitting requests, and delay the occurrence of page colliding read requests. A page hitting data request is a data access request that has a target address with a bank and page that is the same as the bank and page of the DDR memory that is already open. A page colliding data transfer request is a data access request that has a target address with the same bank but different page as that already open at the DDR memory.

When the DDR memory receives a page hitting data access request, the DDR memory can perform the request and return a read response based on the data access request without having to close or open any pages in the DDR memory. However, when the DDR memory receives a page colliding data access request, the DDR memory first closes the currently opened page and then opens a new page targeted by the data access request. Thus, a DDR memory's read response for page colliding data access requests is slower than its read response for page hitting data access requests. To avoid this delay a DDR memory can execute a later received read request before an earlier received read request if it is to an open page of the DDR memory. However, for in-order communication channels, e.g., data channels that need to return information in the order requested, this re-ordering can cause a channel to become blocked, as returning read access request data out of order can result in information being received not being sent to the requesting device. Thus, blocking the channel until the first requested data is received.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
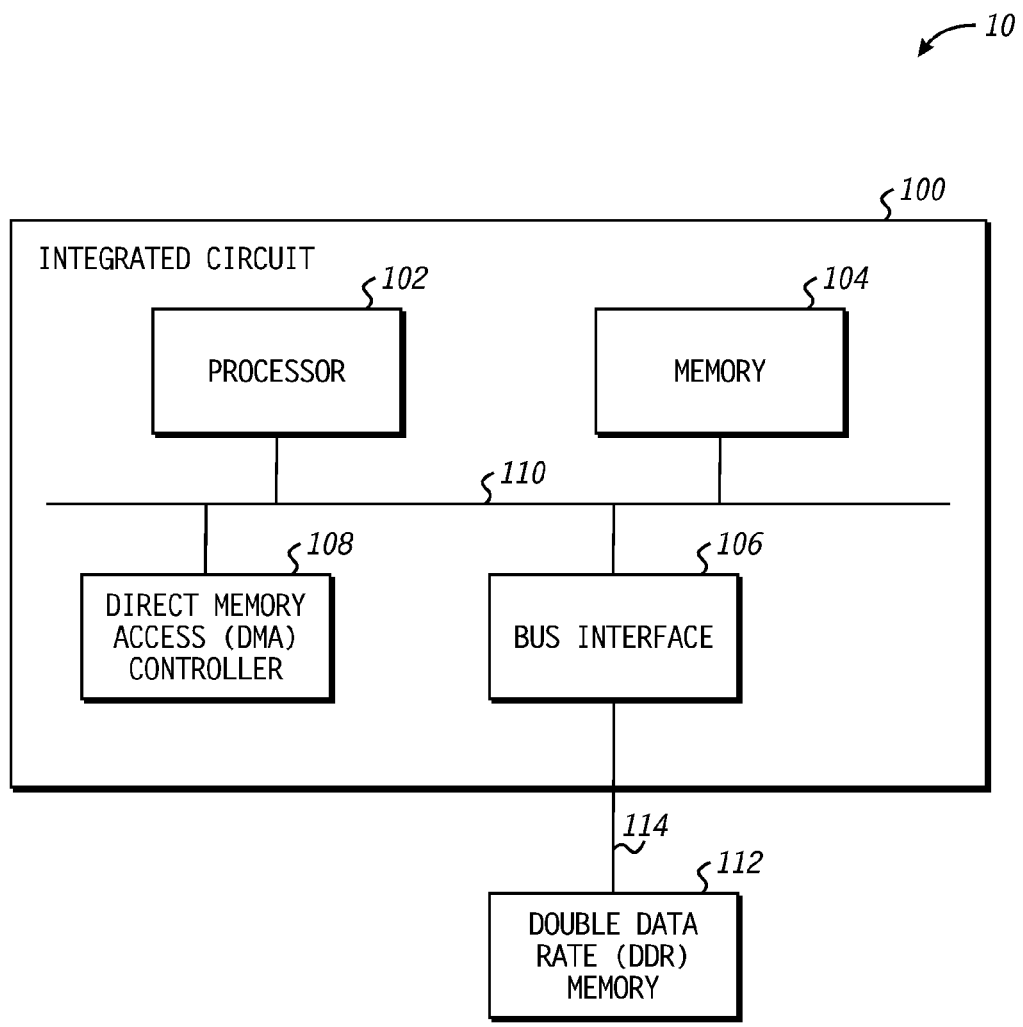
FIG. 1 illustrates a system including an integrated circuit and an external memory in accordance with at least one embodiment of the present disclosure.

A direct memory access (DMA) communications controller receives transfer requests from one or more requesting devices or processes. The device from which the information is to be read is referred to as the source/read device of the DMA transfer request. The device to which the information is to be sent is referred to as the destination/write device of the DMA transfer request. A DMA channel controller is disclosed that can allocate a transfer request to an in-order communication channel that reduces the likelihood of a channel being blocked by DDR devices that can process read requests out-of-order. The allocation of the transfer requests to a communication channel is based on the address bank and page of each pending source/read request on the communication channel.

The DMA controller can selectively assign a DMA transfer request to a channel of a plurality of communication channels by comparing the source address of the DMA transfer request to source addresses of DMA transfer requests pending in the plurality of channels. For example, the comparison can be performed in order to avoid assigning the DMA transfer request to a channel that has a pending access request to a different page of the same bank of DDR memory.

In one embodiment, a DMA transfer request is assigned to a channel having only read requests targeting the same bank and page of the DDR memory as the address bank and page of the DMA transfer being assigned. In this scenario, because all resulting read requests at the channel are to the same bank and page, the additional read request will not be re-ordered by the DDR with respect to each other.

According to a particular embodiment of the present disclosure, the DMA controller includes a DMA scheduler that assigns transfer requests to particular channels. Because not all source devices return information out-of-order, as does DDR memory, the DMA scheduler can compare a source address for a received DMA transfer request to memory map address information accessible by the DMA controller, in order to determine if the source device is a DDR memory. For example, the memory map information can identify one or more local access windows (LAWs) that list address ranges corresponding to DDR memory. If the source address of the DMA transfer request matches a first range of memory addresses in the memory map information, the source device of the DMA transfer request is determined to be a DDR memory. If the source address of the DMA transfer request does not match an identified range of memory, the source device of the DMA transfer request is not for a DDR memory. According to a specific embodiment, the manner to which DMA transfer requests are assigned to DMA channels differs when the source device of the DMA transfer request is a DDR, as opposed to when the source device is a slower type of memory. The manner of scheduling as described herein is with respect to DDR memory or other memory capable of re-ordering received access requests, unless stated otherwise.

In response to determining that the source device is a DDR, a decoder in the DMA controller decodes the source address to determine the DDR bank and page of the DMA transfer request, which is provided to the scheduler. The scheduler assigns the DMA transfer request to one of a number of channels based on the DDR bank and page information of the pending DMA requests of the channels. The scheduler can assign the DMA transfer request to one of a plurality of channels based on a comparison between the source address bank and page of the DMA transfer request and the source address bank and page of any pending DMA transfer requests on the channels. For example, the scheduler can assign the current DMA transfer request to a channel in response to all of the pending DMA transfer requests of that channel targeting the same source address bank and page of the DDR memory as the current DMA transfer request. In this situation, the current DMA transfer request will not be blocked by a preceding DMA transfer request because the pending DMA transfer requests of the channel will be completed by the DDR in order by virtue of their targeting the same page in the DDR memory.

If a channel does not meet the above criteria, the scheduler assigns the current DMA transfer request to a channel that does not have any pending DMA transfer requests targeting the same bank but a different page in the DDR memory. By avoiding assigning a DMA transfer request to a channel with a pending request to the same bank/different page, an associated access request will not be blocked by a collision between the DMA transfer requests.

If the scheduler cannot find any channels that have any of the above criteria, the scheduler selects a channel with a page colliding DMA transfer request that has the most cycles to elapse prior to the current DMA transfer request being sent to the DDR memory. For example, a pending page colliding DMA transfer request having the most cycles to elapse is a DMA transfer request that has a particular number of other DMA transfer requests between it and the current DMA transfer request to allow the page colliding DMA transfer request to be executed in the DDR memory prior to the current DMA transfer request being received at the DDR memory. In this manner there will be no blocking of the current DMA transfer request in the DDR memory. It will be appreciated that, used herein, the term "a DMA transfer request sent to the DDR memory" refers to an access request generated at the channel based on a transfer request being serviced by the channel. Various embodiments of the present disclosure will be better understood with reference to FIGS. 1-7.

FIG. 1 is a block diagram showing components of an embodiment of an integrated circuit 100 of a system 10 in accordance with at least one embodiment of the present disclosure. System 100 can be an integrated circuit die, a packaged device that can include one or more integrated circuit die, a printed circuit board that can include one or more packaged devices and integrated circuit die, the like, and combinations thereof. In an embodiment of the present disclosure, integrated circuit 100 includes processor 102, memory 104, a direct memory access (DMA) controller 108, and a bus interface 106. The components of integrated circuit 100 are interconnected by communication bus 110. The integrated circuit 100 can communicate with other components, such as a double data rate (DDR) memory 112, via the bus interface 106 and the bus 114.

Processor 102 generally represents the main processing core(s) or central processing unit(s) (CPU) for integrated circuit 100. In this regard, the processor 102 executes applications and/or programs for the integrated circuit 100, accesses memory 104 and DDR memory 112, and interacts with other elements of the integrated circuit 100 in a conventional manner. In an embodiment, the processor 102 is implemented or realized as a plurality of microprocessor cores. In alternative embodiments, the processor 102 may be realized with a general purpose processor, a microprocessor, a microcontroller, a content addressable memory, a digital signal processor (DSP), an application-specific integrated circuit (ASIC), a field programmable gate array (FPGA), any suitable programmable logic device, discrete gate or transistor logic, discrete hardware components, or any combination thereof, designed to support and/or perform the functions described herein.

Memory 104 is configured to support operations of the processor 102 as well as other components of the integrated circuit 100 as will be appreciated in the art. In this regard, memory 104 functions as the main memory or primary memory for integrated circuit 100. Depending on the implementation, memory 104 may be realized as RAM memory, ROM memory, flash memory, registers, hard disk, or another suitable storage medium known in the art or any suitable combination thereof.

Bus interface 106 represents the hardware, software, and/or firmware component of integrated circuit 100 configured to support communications between integrated circuit 100 and one or more peripheral (or external) devices, such as DDR memory 112. In an exemplary embodiment, the bus interface 106 provides data transfer requests between the components of the integrated circuit 100 in communication with bus 110 and the DDR memory 112 in communication with the bus 114.

DMA controller 108 implements data transfer requests between components of an integrated circuit, such as the memory 104, and the DDR memory 112. While the data transfer requests are described herein with respect to the DMA controller 108, the data transfer requests can be implemented by any other type of controller. The DMA controller 108 can receive DMA transfer requests from the processor 102, and can retrieve information (e.g., source address, destination address, length, hardware identification, and thread identification) for each DMA transfer request. The processor 102 can store the information and other attributes for the DMA transfer request as a descriptor for the DMA transfer request in a register of a memory, such as a memory internal to the processor 102, memory 104, or the like. The DMA controller 108 can utilize multiple channels of the bus 110 to send the transfer request to the DDR memory 112. In an embodiment, the source address of a DMA transfer request can target an address in the DDR memory 112 that can respond to an access request portion of the transfer request. The assignment of data transfer requests to particular channels of bus 110 will be discussed with respect to FIGS. 2-7 below.

Figure 2:
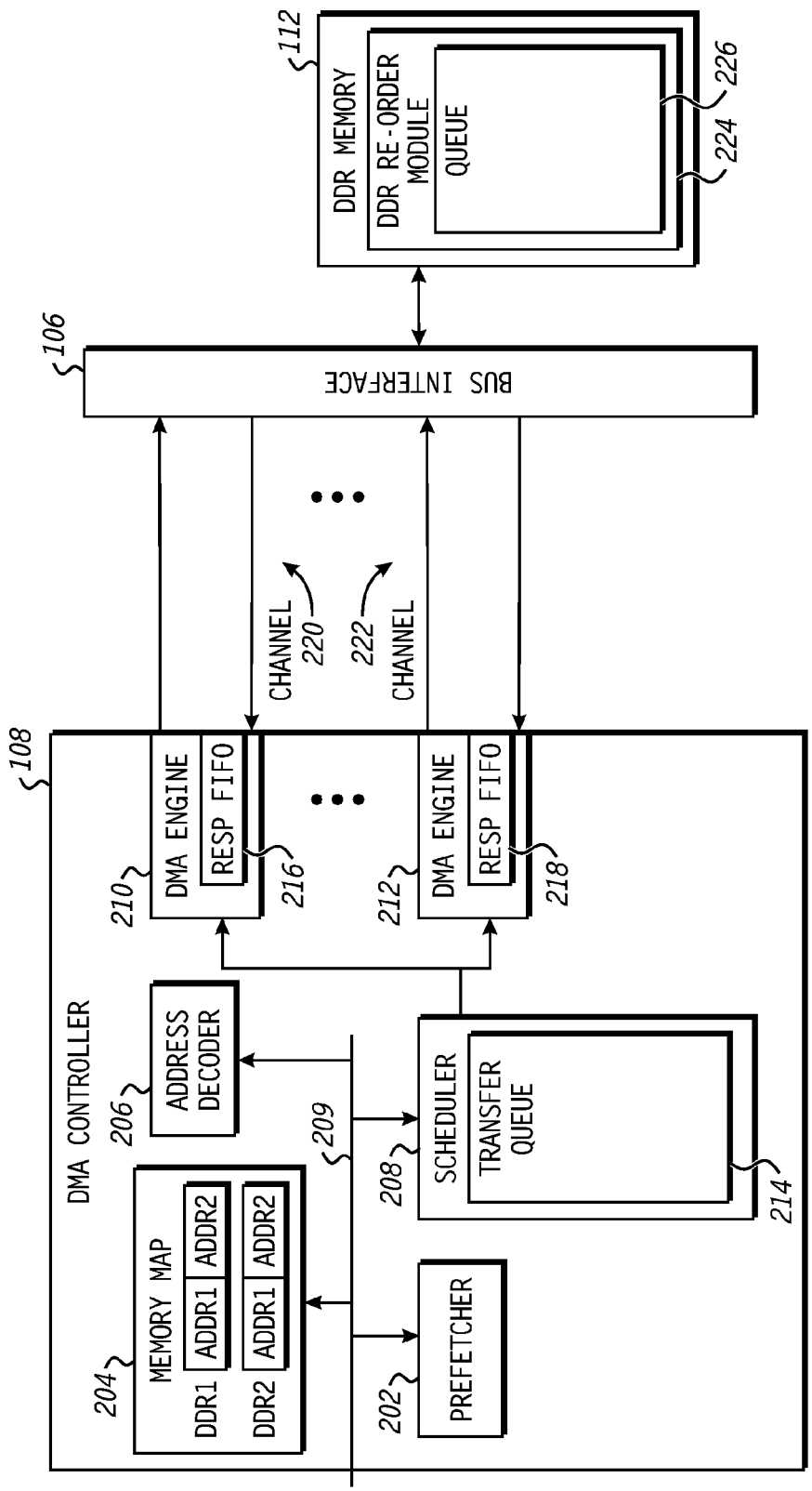
FIGS. 2-6 illustrate a controller within the integrated circuit of FIG. 1 in more detail in accordance with at least one embodiment of the present disclosure.

FIG. 2 illustrates the DMA controller 108, the bus interface 106, and the DDR memory 112 of FIG. 1 in more detail in accordance with at least one embodiment of the present disclosure. The DMA controller 108 includes a prefetcher 202, a memory map 204, an address decoder 206, a scheduler 208, and DMA engines 210 and 212. The scheduler 208 includes a transfer queue 214 to store DMA transfer requests received in the DMA controller 102 from the processor 102 of FIG. 1. The DMA engine 210 includes a response FIFO 216, and the DMA engine 212 includes the FIFO 218. The prefetcher 202, the memory map 204, the address decoder 206, and the scheduler 208 are all in communication with each other via communication bus 209. The scheduler 208 is also in communication with the DMA engines 210 and 212. In different embodiments, the DMA controller 108 can include more DMA engines. However, for simplicity FIGS. 2-6 will be discussed with respect to DMA engines 210 and 212. In different embodiments, each of the DMA engines 210 and 212 can include two or more response FIFOs (e.g., one response FIFO for transfer requests targeting DDR memory, and one response FIFO for transfer requests targeting non-DDR memory), and each response FIFO can be associated with a different channel. However, for simplicity FIGS. 2-6 will be discussed with respect to only the response FIFO 216 of DMA engine 210 and response FIFO 218 of DMA engine 212, and each are associated with transfer requests targeting the DDR memory 112.

The DMA engine 210 and response FIFO 216 are in communication with the bus interface 106, which in turn is in communication with the DDR memory 112. The DMA engine 212 and response FIFO 218 are in communication with the bus interface 106. Each of the DMA engines 210 and 212 is associated with a different channel connected to the bus interface 106. For example, the DMA engine 210 and the response FIFO 216 are in communication with the bus interface 106 via a channel 220. Similarly, the DMA engine 212 and response FIFO 218 are in communication with the bus interface 106 via a channel 222.

The scheduler 208 of the DMA controller 108 can receive a DMA transfer request from another component, such as the processor 102, of the integrated circuit 100 of FIG. 1 and can store the DMA transfer request in the transfer queue 214. The prefetcher 202 can then retrieve information and other attributes for the DMA transfer requests from a register of a memory, such as a memory internal to the processor 102, memory 104, or the like. The DMA controller 108 can handle both a few large DMA transfer requests and many of small DMA transfer requests. The source addresses of large data transfer requests (e.g., greater than four kilobytes) are sequential in order from one transfer request to the next. In this situation, the DDR memory 112 will not have to continually switch back and forth between the same two pages on the same back, because the large data transfer requests sequentially target pages in the DDR memory 112.

A small DMA transfer request can be a transfer request that is less than the size of a page in the DDR memory 112 (e.g., less than one kilobyte). The source address from one small transfer request to the next can be random such that the scheduler 208 can receive a transfer request targeting a first page of a bank, then receive a transfer request targeting a second page of the same bank, and then receive a transfer request targeting the first page of the bank again. Without the DDR memory 112 re-ordering the small data transfer requests, the DDR memory 112 would continually open and close pages between each small data transfer request.

In an embodiment, the DMA transfer request can include a read access request and a write access request. In an embodiment, the transfer request sent to the DDR memory 112 refers to the read access request portion of the overall transfer request. The scheduler 208 compares the source address of the DMA transfer request to the memory map 204 to determine a target for the DMA transfer request, such as the DDR memory 112. The memory map can include one or more local access windows (LAWs), which can list address ranges for memories that can be targeted by a DMA transfer request. For example, the memory map 204 can include an address range for a first DDR memory and a separate address range for a second DDR memory. However, for simplicity memory map 204 will be described herein with the assumption that the memory map 204 only includes an address range for the DDR memory 112.

When the source address of the DMA transfer request matches the address range in the memory map 204 for the DDR memory 112, the scheduler 208 provides the source address of the DMA transfer request to the address decoder 206. The decoder 206 can then decode the source address of the DMA transfer request to generate a DDR bank and row target for the DMA transfer request. In an embodiment, row and page can be used interchangeably to refer to the same location within a bank of the DDR memory 112. The decoder 206 then passes the DDR bank and row target address of the DMA transfer request to the scheduler 208.

When the scheduler 208 receives a DDR bank and row for a current DMA transfer request, the scheduler 208 assigns the DMA transfer request to either channel 220 or channel 222 based on the DDR bank and row of all outstanding transactions of the channels. An outstanding transaction can refer to a DMA transfer request that is stored in a queue of a DMA engine, an outstanding read response for a response FIFO associated with the channel, or the like. In an embodiment, the channels 220 and 222 can utilize a particular communication protocol that requires read responses to be returned from the DDR memory 112 in the same order that the corresponding transfer requests were provided to the DDR memory 112.

The DDR memory 112 can include a DDR re-ordering module 224, which in turn includes a queue 226. The DDR re-ordering module 224 can re-order DMA transfer requests received over the channels 220 and 222 to execute transfer requests that target a current bank and page that is open in the DDR memory 112. The DDR re-ordering module 224 can then store the re-ordered DMA transfer requests in the queue 226 to await execution by the DDR memory 112. In this situation, the DDR memory 112 may execute DMA transfer requests in a different order than the DMA transfer requests were sent in the channel. Thus, a read response to a first request in the re-ordered list in the queue 224 will wait to be returned to the DMA controller 102 until a read response is generated for a DMA transfer request that was first in the channel but that was re-ordered to be later in the DDR memory 112.

In a particular embodiment, the scheduler 208 can optimize the allocation of the DMA transfer requests to the channels to prevent a read response for a page hitting DMA transfer request from not being returned until after a read response to a preceding page colliding DMA transfer request on the same channel. The scheduler 208 can first determine whether channel 220 or 222 has any outstanding transactions. For example, the scheduler 208 can monitor the response FIFOs 216 and 218 and determine whether the response FIFOs 216 and 218 are waiting for any read responses from the DDR memory 112. If one of the response FIFOs 216 or 218 does not currently have any outstanding transfer request, the scheduler 208 can assign a current DMA transfer request to the channel 220 or 222 that is associated with the one of the response FIFOs 216 and 218 that does not have an outstanding transaction.

The scheduler 208 can also determine whether all of the outstanding transactions for channel 220 or 222 target the same bank and the same page of the DDR memory 112 as the current transfer request. If the channel 220 or 222 has all of its outstanding transactions targeting the same bank and the same page of the DDR memory 112 as the current DMA transfer request, the scheduler 208 can assign the current DMA transfer request to that channel. In this situation, the current DMA transfer request will not be blocked by a preceding DMA transfer request because either there are not any other DMA transfer requests assigned to the particular channel, or all of the outstanding transactions of the channel target the same page in the DDR memory 112.

If there is not a channel that meets the criteria stated above, the scheduler 208 can determine whether channel 220 or 222 has any outstanding transactions targeting the same bank but different page in the DDR memory 112 than the current DMA transfer request. If the channel 220 does not have any outstanding transactions targeting the same bank but different page in the DDR memory 112, the scheduler 208 assigns the DMA transfer request to that particular channel. However, if the channel 220 does have outstanding transactions targeting the same bank but different page in the DDR memory 112, the scheduler 208 looks at the channel 222. If the channel 222 does not have any outstanding transactions targeting the same bank but different page in the DDR memory 112, the scheduler 208 assigns the DMA transfer request to that particular channel. In embodiments having more than two channels, scheduler 208 continues to check each channel to determine whether that channel has any outstanding transactions targeting the same bank but different page in the DDR memory. If not, then the DMA transfer request is assigned to that channel. When the current DMA transfer is sent down either channel 220 or 222, the current DMA transfer request will not be blocked in the DDR memory 112 because the DMA transfer requests on the same channel would target different banks in the DDR memory 112, such that the page targeted by the current DMA transfer request can be opened in the DDR memory 112 at the same time as the currently opened page of a different bank.

If no channel meets the above described criteria, the scheduler 208 selects a channel with a page colliding transaction that has the most cycles to elapse prior to the current transfer request. A page colliding transfer request is when the DDR memory 112 currently has a particular bank and page open and the next DMA transfer request targets the same bank but different page of the DDR memory. In such an instance, the DDR memory 112 has to close the first page in the common bank and then open the second page in the bank prior to the DDR memory 112 responding to the next DMA transfer request. By selecting the channel with the page colliding transfer request having the most cycles to elapse, a read response may already be provided to the response FIFO associated with the channel (e.g., channel 216 or 218) before the present DMA transfer request is received in the DDR memory 112 so that there is no blocking of the current DMA transfer request in the DDR memory 112.

Figure 3:
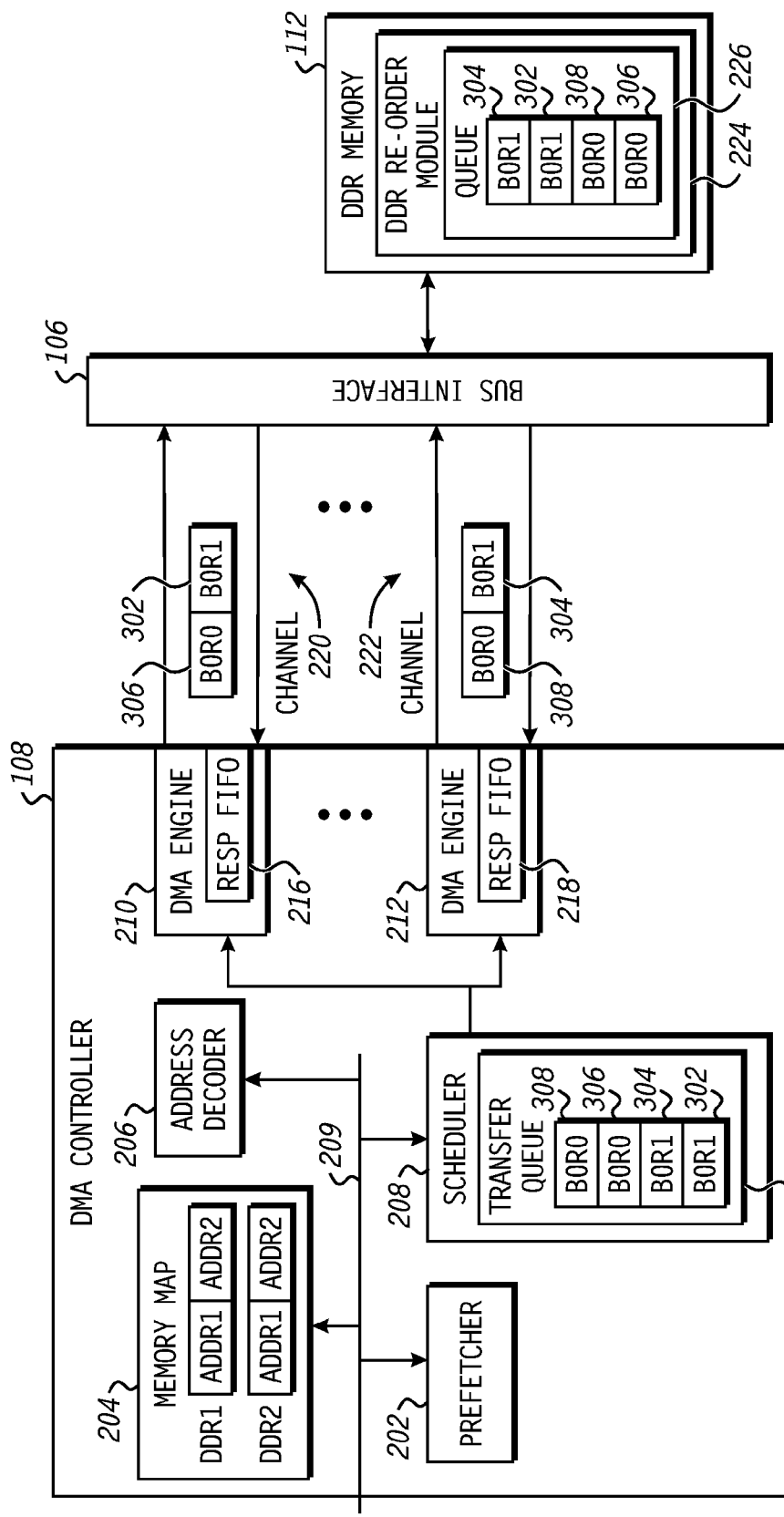

FIG. 3 illustrates an exemplary assignment of the DMA transfer requests 302, 304, 306, and 308 to the channels 220 and 222 in the DMA controller 108 without an optimized data transfer request allocation scheme. The DMA transfer requests 302, 304, 306, and 308 can all be for data stored in the same bank of the DDR memory 112. The scheduler 208 can receive DMA transfer requests 302, 304, 306, and 308, and store the DMA transfer requests in transfer queue 214. The prefetcher 202 can then retrieve the source address and other attributes for each of the DMA transfer requests 302-308 from a register of a memory, such as a memory internal to the processor 102, memory 104, or the like, and can provide the attributes to the scheduler 208. The source address for each DMA transfer request 302-308 can then be compared to the address range in the memory map 204 to determine whether the DMA transfer requests target the DDR memory 112. If the DMA transfer requests target the DDR memory 112, the address decoder 206 generates a DDR bank and page/row for each source address of the DMA transfer requests 302-308. For example, the DDR bank and row of the source address for the DMA transfer request 302 can be bank zero and row one (B0R1), the DDR bank and row of the source address for the DMA transfer request 304 can be B0R1, the DDR bank and row of the source address for the DMA transfer request 306 can be B0R0, and the DDR bank and row of the source address for the DMA transfer request 308 can be B0R0.

The scheduler 208 can then retrieve the DMA transfer requests 302-308 from the transfer queue 214. If the scheduler 208 does not implement an optimized data transfer request allocation scheme, the scheduler 208 can assign the data transfer requests 302-308 to the channels 220 and 222 in a round robin assignment, such that DMA transfer requests 302 and 306 are assigned to the channel 220, and DMA transfer requests 304 and 308 are assigned to the channel 222. When the DMA transfer requests 302-308 are received at the DDR re-order module 224 of the DDR memory 112, the DDR re-order module 224 can re-order the DMA transfer requests based on the bank and row of the DDR memory 112 that is currently open. For example, B0R0 of the DDR memory 112 can be currently open and the DDR re-order module 224 stores the DMA transfer requests so that the DMA transfer requests with DDR bank and page source addresses of B0R0 can be executed first in the DDR memory 112 (e.g., DMA transfer request 306, then DMA transfer request 308, then DMA transfer request 302, and then DMA transfer request 304).

In this situation, even though the DDR memory 112 generates the read responses for DMA transfer requests 306 and 308 before the read responses for the DMA transfer requests 302 and 304. But the ordering requirement of the channels 220 and 222 causes the read responses for the DMA transfer requests 306 and 308 to not be returned to the DMA controller 108 until the read responses for the DMA transfer requests 302 and 304. Thus, the round robin assigning of the DMA transfer requests 302-308 between the channels 220 and 222 in the order listed in the transfer queue 214 can cause page colliding DMA transfer requests (e.g., DMA transfer requests 302 and 306, and DMA transfer requests 304 and 308) to be sent out on both of the channels 220 and 222, and the throughput of the DMA controller 102 is not optimized based on the blocking of the DMA transfer requests 306 and 308.

Figure 4:
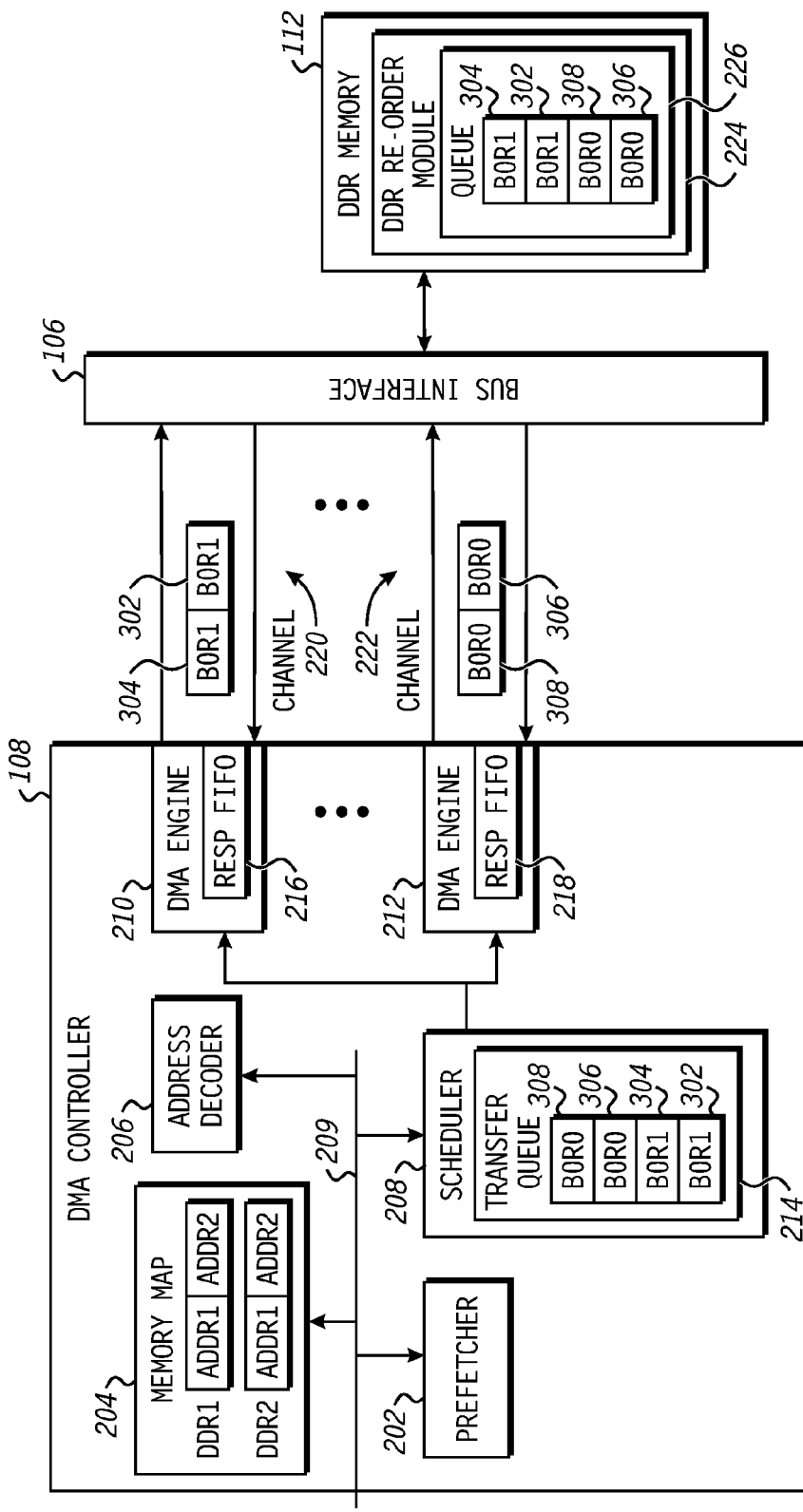

FIG. 4 illustrates an exemplary assignment of the DMA transfer requests 302-308 to the channels 220 and 222 in the DMA controller 108 in accordance with at least one embodiment of the present disclosure. As with FIG. 3, the DMA transfer requests 302, 304, 306, and 308 can all be for data stored in the same bank of the DDR memory 112. When the scheduler 208 assigns the DMA transfer requests 302-308 to the channels 220 and 222, the scheduler 208 can apply the DMA transfer request assignment optimization described above with respect to FIG. 2. For example, the scheduler 208 can first assign the DMA transfer request 302 with the DDR source address B0R1 to the channel 220. The scheduler 208 can then determine that the DDR source address for the DMA transfer request 304 is the same bank and the same row, such as B0R1, as the DMA transfer request 302. Thus, the scheduler 208 can assign the DMA transfer request 304 to the same channel 220 as the DMA transfer request 302.

The scheduler 208 can assign the DMA transfer request 306 with the DDR source address B0R0 to the channel 222. The scheduler 208 can then determine that the DDR source address for the DMA transfer request 308 is the same bank and page, such as B0R0, as the DMA transfer request 306. Thus, the scheduler 208 can assign the DMA transfer request 308 to the same channel 222 as the DMA transfer request 306.

When the DMA transfer requests 302-308 are received at the DDR re-order module 224 of the DDR memory 112, the DDR re-order module 224 can re-order the DMA transfer requests based on the bank and row of the DDR memory 112 that is currently open. For example, B0R0 of the DDR memory 112 can be currently open and the DDR re-order module 224 stores the DMA transfer requests so that the DMA transfer requests with DDR bank and page source addresses of B0R0 can be executed first in the DDR memory 112 (e.g., DMA transfer request 306, then DMA transfer request 308, then DMA transfer request 302, and then DMA transfer request 304).

In this situation, the read responses for DMA transfer requests 306 and 308 can be executed and returned to the DMA controller 108 prior to the read responses for the DMA transfer requests 302 and 304. When the read responses for the DMA transfer requests 306 and 308 are returned to the response FIFO 218, the transactions for the DMA transfer requests 306 and 308 can be completed and the DMA engine 210 and response FIFO 216 can be released to process additional DMA transfer requests. Thus, the throughput of the DMA controller 102 can be increased by the scheduler 208 optimizing the allocation of the DMA transfer requests 302-308 to a channel with outstanding transactions that have the same source address bank and page as the current DMA transfer.

Figure 5:
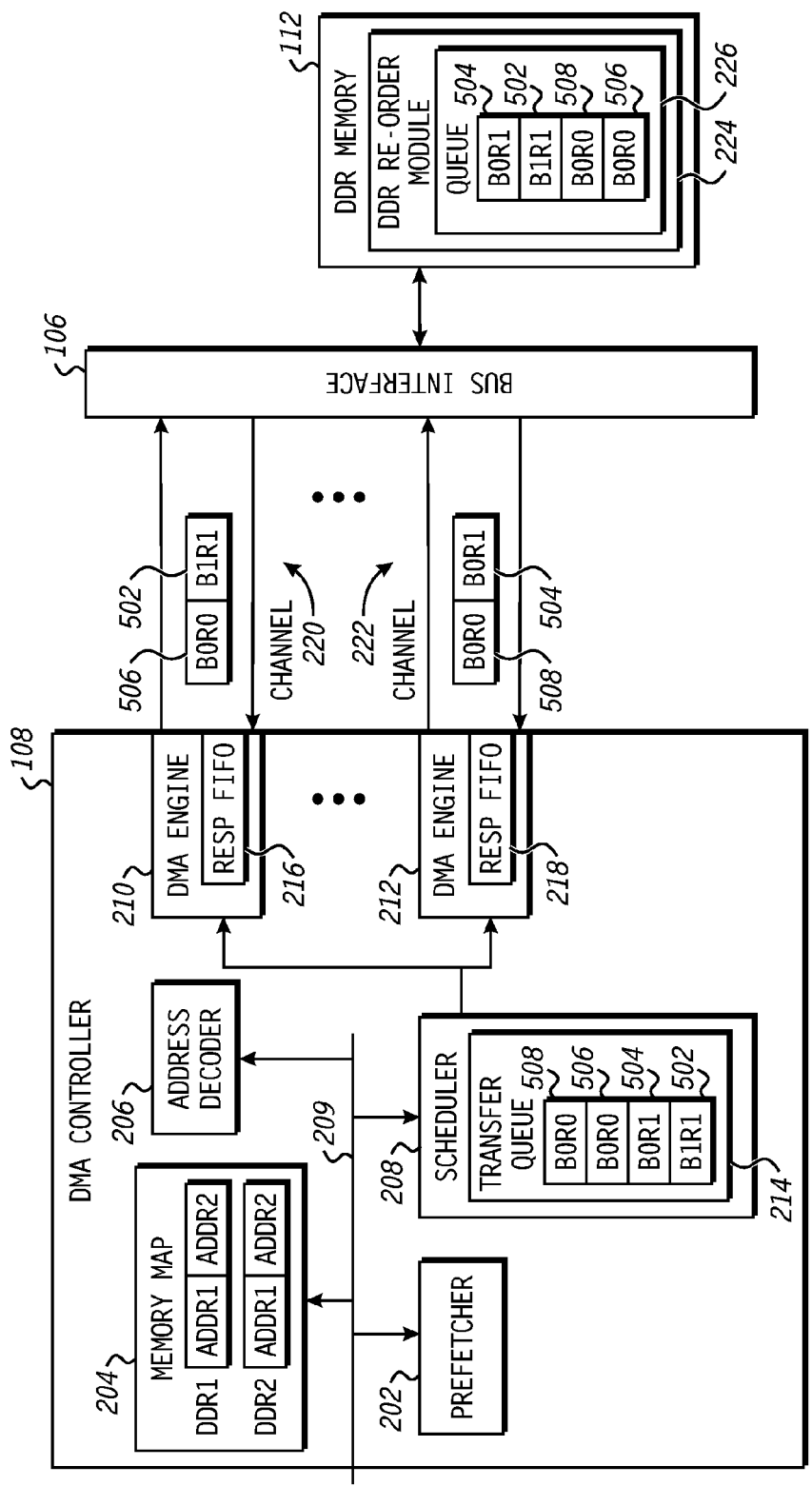

FIG. 5 illustrates an exemplary assignment of DMA transfer requests 502, 504, 506, and 508 to the channels 220 and 222 in the DMA controller 108. The DMA transfer requests 502, 504, 506, and 508 can be for data stored in multiple banks of the DDR memory 112. The scheduler 208 can receive DMA transfer requests 502, 504, 506, and 508, and the scheduler 208 can store the DMA transfer requests 502-508 in the transfer queue 214. The prefetcher 202 can then retrieve the source address and other attributes for each of the DMA transfer requests 502-508, and can provide the attributes to the scheduler 208. The source address for each DMA transfer request 502-508 can then be compared to the address range in the memory map 204 to determine whether the DMA transfer requests target the DDR memory 112. If the DMA transfer requests target the DDR memory 112, the address decoder 206 generates a DDR bank and row/page for each source address of the DMA transfer requests 502-508. For example, the DDR bank and page of the source address for the DMA transfer request 502 can be B1R1, the DDR bank and page of the source address for the DMA transfer request 504 can be B0R1, the DDR bank and page of the source address for the DMA transfer request 506 can be B0R0, and the DDR bank and page of the source address for the DMA transfer request 508 can be B0R0.

The scheduler 208 can then retrieve the DMA transfer requests 502-508 from the transfer queue 214. If the scheduler 208 does not implement an optimized data transfer request allocation scheme, the scheduler 208 can assign the data transfer requests 502-508 to the channels 220 and 222 in a round robin assignment, such that DMA transfer requests 502 and 506 are assigned to the channel 220, and DMA transfer requests 504 and 508 are assigned to the channel 222. When the DMA transfer requests 502-508 are received at the DDR re-order module 224 of the DDR memory 112, the DDR re-order module 224 can re-order the DMA transfer requests based on the bank and row of the DDR memory 112 that is currently open. For example, B0R0 of the DDR memory 112 can be currently open and the DDR re-order module 224 stores the DMA transfer requests so that the DMA transfer requests with DDR bank and page source addresses of B0R0 can be executed first in the DDR memory 112 (e.g., DMA transfer request 506, then DMA transfer request 508, then DMA transfer request 502, and then DMA transfer request 504).

In this situation, even though the DDR memory 112 generates the read responses for DMA transfer requests 506 and 508 before the read responses for the DMA transfer requests 502 and 504, the ordering requirement of the channels 220 and 222 cause the read responses for the DMA transfer requests 506 and 508 to not be returned to the DMA controller 108 until the read responses for the DMA transfer requests 502 and 504. Thus, the round robin assigning of the DMA transfer requests 502-508 can cause page colliding DMA transfer requests (e.g., DMA transfer requests 502 and 506, and DMA transfer requests 504 and 508) to be sent out on both of the channels 220 and 222, and the throughput of the DMA controller 102 is not optimized based on the blocking of the DMA transfer requests 506 and 508.

Figure 6:
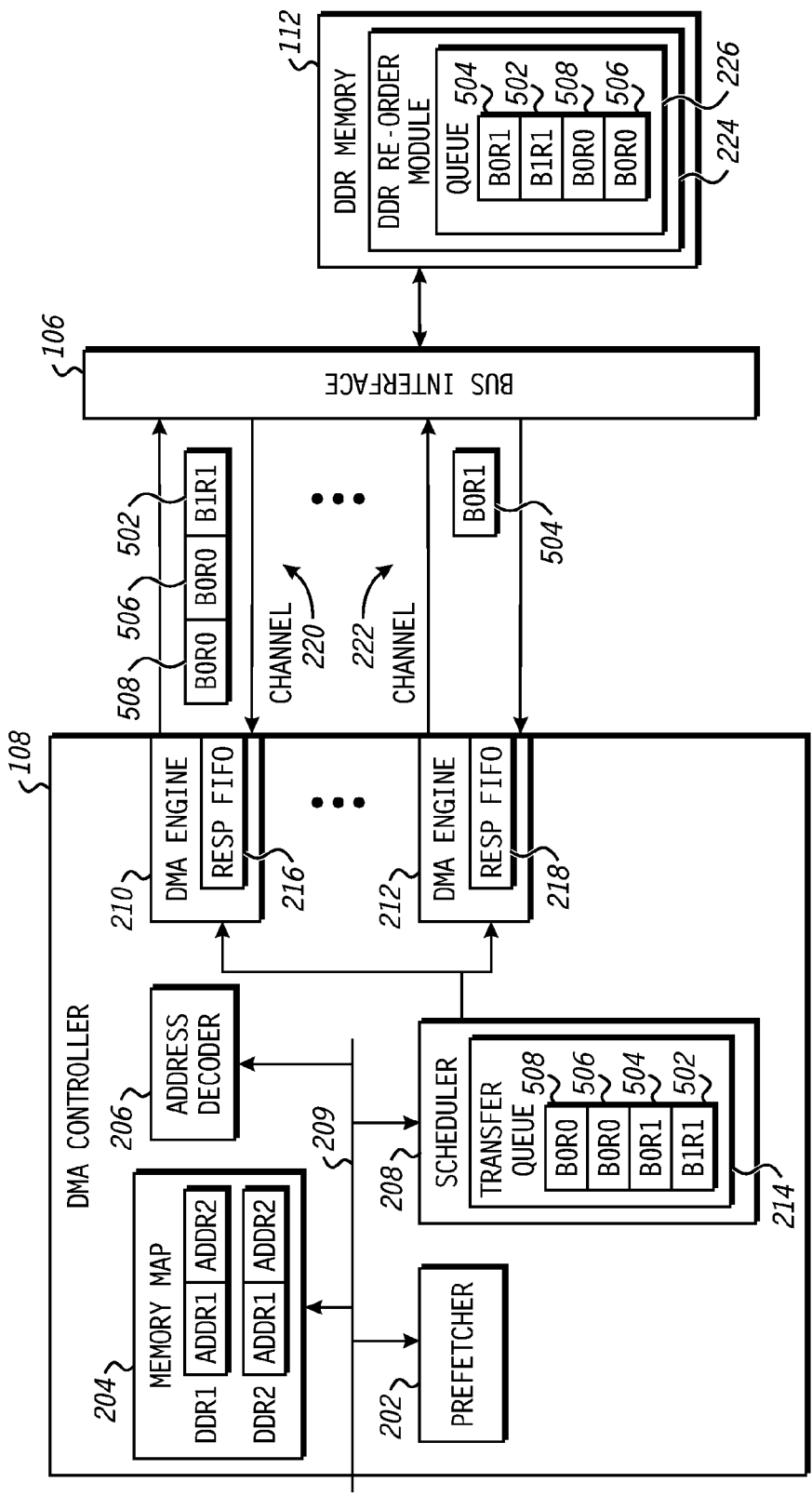

FIG. 6 illustrates an exemplary assignment of the DMA transfer requests 502, 504, 506, and 508 to the channels 220 and 222 in the DMA controller 108 in accordance with at least one embodiment of the present disclosure. The DMA transfer requests 502, 504, 506, and 508 can be for data stored in multiple banks of the DDR memory 112. When the scheduler 208 assigns the DMA transfer requests 502-508 to the channels 220 and 222, the scheduler 208 can apply the DMA transfer request assignment optimization described above with respect to FIG. 2. For example, the scheduler 208 can first assign the DMA transfer request 502 with the DDR source address B1R1 to the channel 220. The scheduler 208 can then assign the DMA transfer request 504 to the channel 222.

The scheduler 208 can determine that the DMA transfer request 504 is a page colliding DMA transfer request for the DMA transfer request 506 based on the DMA transfer requests 504 and 506 having source address with the same bank and different pages. The scheduler 208 can also determine that DMA transfer request 502 is not a page colliding DMA transfer request for the DMA transfer request 506 based on the DMA transfer requests 502 and 506 not having the same bank or the same page. Thus, the scheduler 208 can assign the DMA transfer request 506 with the DDR source address B0R0 to the channel 220. The scheduler 208 can then determine that the DDR source address for the DMA transfer request 508 is the same bank and page, B0R0, as the DMA transfer request 506. Thus, the scheduler 208 can assign the DMA transfer request 508 to the same channel 220 as the DMA transfer request 506.

When the DMA transfer requests 502-508 are received at the DDR re-order module 224 of the DDR memory 112, the DDR re-order module 224 can re-order the DMA transfer requests based on the bank and row of the DDR memory 112 that is currently open. For example, B0R0 of the DDR memory 112 can be currently open and the DDR re-order module 224 stores the DMA transfer requests so that the DMA transfer requests with DDR bank and page source addresses of B0R0 can be executed first in the DDR memory 112 (e.g., DMA transfer request 506, then DMA transfer request 508, then DMA transfer request 502, and then DMA transfer request 504).

In this situation, the read responses for DMA transfer requests 506 and 508 can be executed and returned to the DMA controller 108 prior to the read responses for the DMA transfer requests 502 and 504. In this embodiment, the DMA transfer request 502 is not a page colliding DMA transfer request with respect to the DMA transfer requests 506 and 508. Thus, when the read responses for the DMA transfer requests 506 and 508 are returned to the response FIFO 216, the transactions for the DMA transfer requests 506 and 508 can be completed and the DMA resources DMA engine 210 and response FIFO 216 can be released to process additional DMA transfer requests. Thus, the throughput of the DMA controller 102 can be increased by the scheduler 208 optimizing the allocation of the DMA transfer requests 502-508 to a channel with outstanding transactions that have the same source address bank and page as the current DMA transfer.

Figure 7:
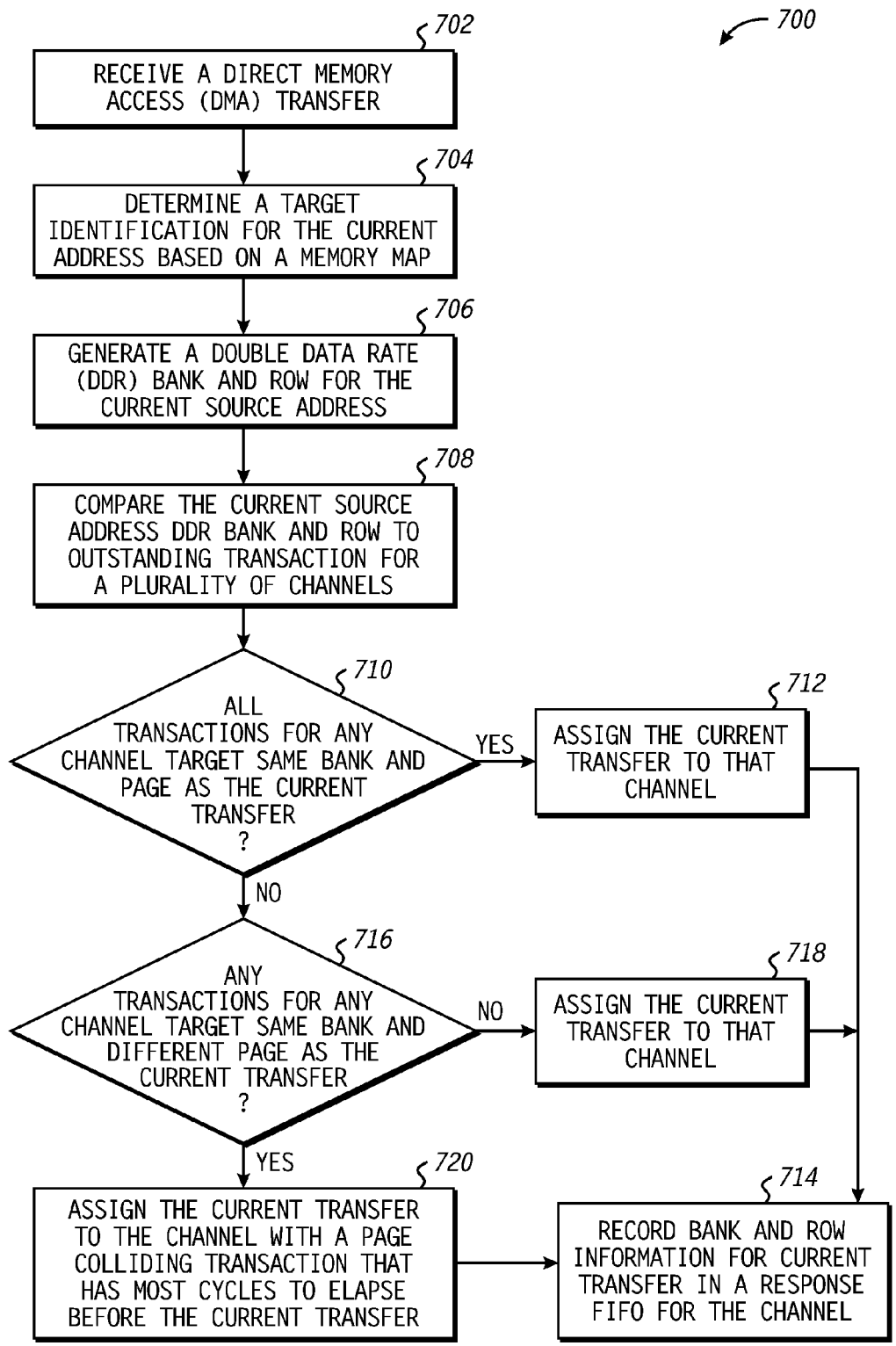
FIG. 7 illustrate a flow diagram of a method for assigning memory data transfer requests between multiple communication channels from the controller to the external memory of FIG. 1 in accordance with at least one embodiment of the present disclosure.

FIG. 7 illustrates a flow diagram of a method for assigning memory data transfer requests between multiple channels from a DMA controller to an associated external memory of FIG. 1 in accordance with at least one embodiment of the present disclosure. At block 702, a DMA transfer request is received from another component, such as a processor. In an embodiment, the DMA transfer request can include a read access request for a DDR memory. At block 704, a source address of the DMA transfer request is compared to an address range in a memory map to determine a target for the DMA transfer request (e.g., an associated DDR memory). The memory map can include one or more local access windows (LAWs), which list address ranges for memories that can be targeted by a DMA transfer request. For example, the memory map can include an address range for a first associated DDR memory and a separate address range for a second associated DDR memory.

At block 706, the source address of the DMA transfer request is decoded to generate a DDR bank and page target for the DMA transfer request. The current source address bank and page for the DMA transfer request are compared to the DDR bank and page of any outstanding transactions for a plurality of channels between the DMA controller and the associated external memory at block 708. At block 710, a determination is made as to whether all transactions for a channel of the plurality of channels target the same bank and page as the current DMA transfer request.

If all transactions for any channel target the same source address bank and page as the current DMA transfer request, the current DMA transfer request is assigned to that channel at block 712. At block 714, the bank and row information for the current DMA transfer request is recorded in a response FIFO.

If all transactions for any channel do not target the same source address bank and page as the current DMA transfer request (710), a determination is made as to whether any transactions for any channel target the same bank but different page as the current DMA transfer request at block 716. If the transactions for a channel do not target the same source address bank but different page as the current DMA transfer request, the current DMA transfer request is assigned to that channel at block 718 and the flow continues as stated above at block 714.

However, if at least one transaction for a channel does target the same source address bank but different page as the current DMA transfer request (716), the current DMA transfer request is assigned to a channel with the page colliding transaction that also has the most cycles that elapse to prior to the current DMA transfer request being assigned to the channel (720) and the flow continues as stated above at block 714.

In accordance with one aspect of the present disclosure, a method is disclosed. The method includes receiving a first memory transfer request at a communication channel controller. The method also includes allocating the first memory transfer request to a first communication channel of a plurality of communication channels in response to the first communication channel having all of its outstanding memory transactions to a common source address bank and source address page as a source address bank and source address page of the first memory transfer request. In one embodiment, the method further includes receiving a second memory transfer request at the communication channel controller. The method also includes allocating the second memory transfer request to a second communication channel of the plurality of communication channels in response to the second communication channel having no outstanding memory transactions with a source address bank that is the same as a source address bank of the second memory transfer request but a source address page that is different than a source address page of the second memory transfer request.

In one embodiment, the method includes receiving a third memory transfer request at the communication channel controller. The method also includes allocating the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel any other communication channel of the plurality of communication channels.

In one embodiment, the outstanding transaction that is page colliding with the third memory transfer comprises a source address bank that is the same as a source address bank of the third memory transfer but a source address page that is different than the source address page of the third memory transfer.

In one embodiment, determining that the first memory transfer request identifies a double data rate memory as a source of the first memory transfer request prior to said allocating the first memory transfer to the first communication channel. In a further embodiment, an outstanding transaction is selected from a group that includes a second memory transfer request waiting to be sent to the double data rate memory, and an outstanding read response associated with the second memory transfer request sent to the double data rate memory.

In another embodiment, an order of a plurality of memory transfers sent along a communication channel from the communication channel controller is required to be maintained when read responses associated with the plurality of memory transfers are received at the communication channel controller along the communication channel.

In accordance with one aspect of the present disclosure, a communication channel controller is disclosed. The communication controller includes a plurality of communication channels that are communicatively coupled to a memory external to the communication channel controller. The memory includes source address banks and source address pages. The communication channel controller further includes a scheduler communicatively coupled to the plurality of communication channels. The scheduler is configured to receive a first memory transfer request, and allocate the first memory transfer request to a first communication channel of the plurality of communication channels in response to the first communication channel having all of its outstanding memory transactions to a common source address bank and source address page as a source address bank and source address page of the first memory transfer request.

In one embodiment, the scheduler is further configured to receive a second memory transfer request, and allocate the second memory transfer request to a second communication channel of the plurality of communication channels in response to the second communication channel having no outstanding memory transactions with a source address bank that is the same as a source address bank of the second memory transfer request but a source address page that is different than a source address page of the second memory transfer request.

In one embodiment, the scheduler is further configured to receive a third memory transfer request, and allocate the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel any other communication channel of the plurality of communication channels. In a further embodiment, the outstanding transaction that is page colliding with the third memory transfer comprises a source address bank that is the same as a source address bank of the third memory transfer but a source address page that is different than the source address page of the third memory transfer.

In another embodiment, an outstanding transaction is selected from a group that includes a second memory transfer request waiting to be sent to the memory, and an outstanding read response associated with the second memory transfer request sent to the memory. In yet another embodiment, an order of a plurality of memory transfers sent along a communication channel from the communication channel controller is required to be maintained when read responses associated with the plurality of memory transfers are received at the communication channel controller along the communication channel.

In one embodiment, the memory is a double data memory and the communication channel controller further includes a direct memory access engine configured to send the first memory transfer request to the double data memory via the first communication channel of the plurality of communication channels, and record the source address bank and page of the first memory transfer request for the first memory transfer request as an outstanding transaction for the first communication channel of the plurality of communication channels.

In accordance with one aspect of the present disclosure, another method is disclosed. The method includes receiving a first memory transfer request at a communication channel controller. In this case, the communication channel controller to control allocation of a plurality of memory transfer requests to a plurality of communication channels. The method also includes determining whether any of the plurality of communication channels has all of its outstanding memory transactions that meet a first criteria. In this case, the first criteria is that the outstanding memory transaction has a source address bank and page that is the same as the source address bank and page of the first memory transfer request. The method further includes in response to one or more of the plurality of communication channels having all of its outstanding memory transactions meet the first criteria, allocating the first memory transfer request to a first communication channel of the one or more of the plurality of communication channels.

The method also includes in response to none of the plurality of communication channels having the outstanding memory transaction that meets the first criteria, determining whether the outstanding memory transaction on any of the first plurality of communication channels meets a second criteria. In this case, the second criteria is that the outstanding memory transaction does not have a source address bank that is the same as the source address bank but a source address page that is different than the source address page of the first memory transfer request. The method also includes in response to the outstanding memory transaction of one or more of the plurality of communication channels meeting the second criteria, allocating the first memory transfer request to a second communication channel of the one or more of the plurality of channel.

In one embodiment, the plurality of communication channels is a sub-set of the available channel in the communication controller. In one embodiment, the method also includes in response to none of the plurality of communication channels having the outstanding memory transaction that meets either the first criteria or the second criteria, allocating the first memory transfer request to a third priority to a third communication channel having an outstanding transaction that is page colliding with the first memory transfer and also has more clock cycles to elapse prior to the first memory transfer request being assigned to the third communication channel than the first communication channel or the second communication channel. In this case, the outstanding transaction that is page colliding with the first memory transfer comprises a source address bank that is the same as a source address bank of the first memory transfer but a source address page that is different than the source address page of the first memory transfer.

In one embodiment, an order of a plurality of memory transfers sent along a communication channel from the communication channel controller is required to be maintained when read responses associated with the plurality of memory transfers are received at the communication channel controller along the communication channel. In one embodiment, the method also includes determining that the first memory transfer request identifies a double data rate memory as the source of the first memory transfer request prior to determining whether the outstanding memory transaction on any of the plurality of communication channels meets the first criteria.

In accordance with one aspect of the present disclose, a communication channel controller is disclosed. The communication channel controller includes a queue configured to store first memory transfer request received at the communication channel controller. The communication channel controller further includes a memory map storing information to identify a memory address range to be associated with a type of memory. The communication channel controller also includes a scheduler communicatively coupled to the queue and to the memory map. The scheduler is configured to compare a source address of the first memory transfer request in the queue to the memory address range in the memory map to determine whether the source address of the first memory transfer request target the type of memory, and in response allocate the first memory transfer request to a first communication channel of a plurality of communication channels in response to the first communication channel having all of its outstanding memory transactions to a common source address bank and source address page as a source address bank and a source address page of the first memory transfer request.

In one embodiment, the communication channel controller also includes an address decoder communicatively coupled to the scheduler. The address decoder is configured to generate the source address bank and the source address page of the first memory transfer request and provide the source address bank and the source address page of the first memory transfer request to the scheduler. In another embodiment, the communication channel controller also includes a prefetcher communicatively coupled to the scheduler. The prefetcher is configured to retrieve information and other attributes for the first memory transfer request and provide the information and the other attributes to the scheduler.

In one embodiment, the communication channel controller further includes a direct memory access engine communicatively coupled to the scheduler. The direct memory access engine is configured to send the first memory transfer request to a double data memory via the first communication channel of the plurality of communication channels, and record the source address bank and page of the first memory transfer request for the first memory transfer request as an outstanding transaction for the first communication channel of the plurality of communication channels.

In one embodiment, the queue is further configured to store a second memory transfer request, and the scheduler is further configured to compare a source address of the second memory transfer in the queue to the memory address range in the memory map to determine whether the source address of the second memory transfer request targets the memory, and in response allocate the second memory transfer request to a second communication channel of the plurality of communication channels in response to the second communication channel having no outstanding memory transactions with a source address bank that is the same as a source address bank of the second memory transfer request but a source address page that is different than a source address page of the second memory transfer request.

In one embodiment, the queue is further configured to store a third memory transfer request, and the scheduler is further configured to compare a source address of the third memory transfer in the queue to the memory address range in the memory map to determine whether the source address of the second memory transfer request targets the memory, and in response allocate the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel any other communication channel of the plurality of communication channels.

The concepts of the present disclosure have been described above with reference to specific embodiments. However, one of ordinary skill in the art will appreciate that various modifications and changes can be made without departing from the scope of the present disclosure as set forth in the claims below. In particular, the selective assignment of DMA transfer requests based on the source addresses of the pending transfer requests can be applied to any type of memory that can receive and internally re-order access requests, not just DDR memory. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   receiving a first memory transfer request at a communication channel controller;
   comparing a source address bank and a source address page of the first memory transfer request to source address banks and source address pages of outstanding memory transactions on a first communication channel;
   allocating the first memory transfer request to the first communication channel of a plurality of communication channels in response to determining that the first communication channel has all of its outstanding memory transactions to a common source address bank and source address page as the source address bank and the source address page of the first memory transfer request;
   receiving a second memory transfer request at the communication channel controller; and
   comparing a source address bank and a source address page of the second memory transfer request to source address banks and source address pages of the outstanding memory transactions on the second communication channel;
   allocating the second memory transfer request to a second communication channel of the plurality of communication channels in response to determining that the second communication channel having no outstanding memory transactions with a source address bank that is the same as the source address bank of the second memory transfer request but a source address page that is different than the source address page of the second memory transfer request.

2. The method of claim 1 further comprising:
   receiving a third memory transfer request at the communication channel controller; and
   allocating the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel than any other communication channel of the plurality of communication channels.

3. The method of claim 2 wherein the outstanding transaction that is page colliding with the third memory transfer comprises a source address bank that is the same as a source address bank of the third memory transfer but a source address page that is different than the source address page of the third memory transfer.

4. The method of claim 1 further comprising:
   determining that the first memory transfer request identifies a double data rate memory as a source of the first memory transfer request prior to said allocating the first memory transfer to the first communication channel.

5. The method of claim 4 wherein an outstanding memory transaction is selected from a group comprising: a second memory transfer request waiting to be sent to the double data rate memory, and an outstanding read response associated with the second memory transfer request sent to the double data rate memory.

6. The method of claim 1 wherein an order of a plurality of memory transfers sent along a communication channel from the communication channel controller is required to be maintained when read responses associated with the plurality of memory transfers are received at the communication channel controller along the communication channel.

7. A communication channel controller comprising:
   a plurality of communication channels communicatively coupled to a memory external to the communication channel controller, wherein the memory comprises source address banks and source address pages;
   a scheduler, communicatively coupled to the plurality of communication channels, the scheduler configured to
      receive a first memory transfer request,
      compare a source address bank and a source address page of the first memory transfer request to source address banks and source address pages of outstanding memory transactions on a first communication channel of the plurality of communication channels,
      allocate the first memory transfer request to the first communication channel of the plurality of communication channels in response to a determination that the first communication channel has all of its outstanding memory transactions to a common source address bank and source address page as the source address bank and the source address page of the first memory transfer request;

receive a second memory transfer request, compare a source address bank and a source address page of the second memory transfer request to source address banks and source address pages of the outstanding memory transactions on a second communication channel of the plurality of communication channels, and allocate the second memory transfer request to the second communication channel of the plurality of communication channels in response to a determination that the second communication channel has no outstanding memory transactions with a source address bank that is the same as the source address bank of the second memory transfer request but a source address page that is different than the source address page of the second memory transfer request.

8. The communication channel controller of claim 7, wherein the scheduler is further configured to receive a third memory transfer request, and allocate the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel than any other communication channel of the plurality of communication channels.

9. The communication channel controller of claim 8 wherein the outstanding transaction that is page colliding with the third memory transfer comprises a source address bank that is the same as a source address bank of the third memory transfer but a source address page that is different than the source address page of the third memory transfer.

10. The communication channel controller of claim 7 wherein an outstanding transaction is selected from a group comprising:

a second memory transfer request waiting to be sent to the memory, and an outstanding read response associated with the second memory transfer request sent to the memory.

11. The communication channel controller of claim 7 wherein an order of a plurality of memory transfers sent along a communication channel from the communication channel controller is required to be maintained when read responses associated with the plurality of memory transfers are received at the communication channel controller along the communication channel.

12. The communication channel controller of claim 7 wherein the memory comprises a double data rate memory, and the communication channel controller further comprising:

a direct memory access engine, communicatively coupled to the scheduler, the direct memory access engine configured to send the first memory transfer request to the double data memory via the first communication channel of the plurality of communication channels, and record the source address bank and page of the first memory transfer request for the first memory transfer request as an outstanding transaction for the first communication channel of the plurality of communication channels.

13. The communication channel controller of claim 7, wherein an outstanding memory transaction is a transaction selected from a group comprising: a second memory transfer request waiting to be sent to the double data rate memory, and an outstanding read response associated with the third memory transfer request sent to the double data rate memory.

14. The communication channel controller of claim 13, wherein the outstanding read response associated with the third memory transfer request sent to the double data rate memory.

15. A communication channel controller comprising:

a plurality of communication channels;

a memory to store a queue configured to store a first memory transfer request received at the communication channel controller, and to store a second memory transfer request received at the communication channel controller;

a memory map storing information to identify a memory address range to be associated with a type of memory; and a scheduler communicatively coupled to the queue, to the memory map, and to the plurality of communication channels, the scheduler configured to compare a source address of the first memory transfer request in the queue to the memory address range in the memory map to determine whether the source address of the first memory transfer request target the type of memory, to compare a source address bank and source address page of the first memory transfer request to source address banks and source address pages of outstanding memory transactions on a first communication channel of the plurality of communication channels, and to allocate the first memory transfer request to the first communication channel of the plurality of communication channels in response to the first communication channel having all of its outstanding memory transactions to a common source address bank and source address page as the source address bank and the source address page of the first memory transfer request, and the scheduler is further configured to compare a source address of the second memory transfer in the queue to the memory address range in the memory map to determine whether the source address of the second memory transfer request targets the memory, to compare a source address bank and source address page of the second memory transfer request to source address banks and source address pages of outstanding memory transactions on a second communication channel of the plurality of communication channels, and to allocate the second memory transfer request to the second communication channel of the plurality of communication channels in response to the second communication channel having no outstanding memory transactions with a source address bank that is the same as the source address bank of the second memory transfer request but the source address page that is different than a source address page of the second memory transfer request.

16. The communication channel controller of claim 15 further comprising:

an address decoder communicatively coupled to the scheduler, the address decoder configured to generate the source address bank and the source address page of the first memory transfer request and provide the source address bank and the source address page of the first memory transfer request to the scheduler.

17. The communication channel controller of claim 15 further comprising:

a prefetcher communicatively coupled to the scheduler, the prefetcher configured to retrieve information and other attributes for the first memory transfer request and provide the information and the other attributes to the scheduler.

18. The communication channel controller of claim 15 further comprising:
a direct memory access engine communicatively coupled to the scheduler, the direct memory access engine configured to send the first memory transfer request to a double data rate memory via the first communication channel of the plurality of communication channels, and record the source address bank and page of the first memory transfer request for the first memory transfer request as an outstanding transaction for the first communication channel of the plurality of communication channels.

19. The communication channel controller of claim 15, wherein the queue is further configured to store a third memory transfer request, and the scheduler is further configured to compare a source address of the third memory transfer in the queue to the memory address range in the memory map to determine whether the source address of the third memory transfer request targets the memory, and in response allocate the third memory transfer request to a third communication channel of the plurality of communication channels in response to the third communication channel having an outstanding transaction that is page colliding with the third memory transfer and also has more cycles to elapse prior to the third memory transfer request being assigned to the third communication channel than any other communication channel of the plurality of communication channels.

20. The communication channel controller of claim 15, wherein an outstanding memory transaction is a transaction selected from a group comprising: a third memory transfer request waiting to be sent to a double data rate memory, and an outstanding read response associated with the third memory transfer request sent to the double data rate memory.

* * * * *